(12) United States Patent
Lu

(10) Patent No.: US 10,778,907 B2
(45) Date of Patent: Sep. 15, 2020

(54) CAMERA ASSEMBLY WITH A PLURALITY OF CAMERAS AND HAVING LARGE SHOOTING ANGLE, AND ELECTRONIC APPARATUS HAVING THE SAME

(71) Applicant: Guangdong OPPO Mobile Telecommunications Corp., Ltd., Dongguan, Guangdong (CN)

(72) Inventor: Jianqiang Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/415,385

(22) Filed: May 17, 2019

(65) Prior Publication Data
US 2019/0356862 A1 Nov. 21, 2019

(30) Foreign Application Priority Data
May 21, 2018 (CN) .......................... 2018 1 0488516

(51) Int. Cl.
*H04N 5/247* (2006.01)
*H04N 5/232* (2006.01)
*H04N 5/225* (2006.01)

(52) U.S. Cl.
CPC .......... *H04N 5/247* (2013.01); *H04N 5/2253* (2013.01); *H04N 5/2257* (2013.01); *H04N 5/23299* (2018.08)

(58) Field of Classification Search
CPC .... H04N 5/247; H04N 5/2257; H04N 5/2253; H04N 5/23299; H04N 5/2258; H04N 5/3415; H04M 1/0264
See application file for complete search history.

(56) References Cited

U.S. PATENT DOCUMENTS 8,908,054 B1 * 12/2014 Koenck ................ H04N 5/2254
                                                        348/218.1
9,497,380 B1    11/2016 Jannard et al.
(Continued)

FOREIGN PATENT DOCUMENTS

CN    108737701 A    11/2008
CN    102129163 A     7/2011
(Continued)

OTHER PUBLICATIONS

International search report issued in corresponding international application No. PCT/CN2019/087645 dated Jul. 23, 2019.
(Continued)

*Primary Examiner* — Gevell V Selby

(57) ABSTRACT

A camera assembly may include a first camera including a first light incident surface, a second camera including a second light incident surface, and a third camera including a third light incident surface. The first camera, the second camera, and the third camera may be spaced apart from each other in a same direction, and the second camera may be located between the first camera and the third camera. The first light incident surface and the second light incident surface may form a first preset angle in a range of 90° to 180°. The second light incident surface and the third light incident surface may form a second preset angle in a range of 90° to 180°.

18 Claims, 12 Drawing Sheets

(56) References Cited

U.S. PATENT DOCUMENTS

| | | | |
|---|---|---|---|
| 2010/0097443 A1 | 4/2010 | Lablans | |
| 2010/0103300 A1 | 4/2010 | Jones et al. | |
| 2010/0265331 A1* | 10/2010 | Tanaka .................. | H04N 7/181 |
| | | | 348/159 |
| 2010/0265441 A1* | 10/2010 | Hongo .............. | G02F 1/133553 |
| | | | 349/113 |
| 2011/0128393 A1 | 6/2011 | Tavi et al. | |
| 2011/0157451 A1* | 6/2011 | Chang .................... | H04N 5/332 |
| | | | 348/336 |
| 2011/0170849 A1 | 7/2011 | Chang | |
| 2016/0173757 A1 | 6/2016 | Choi | |
| 2017/0094222 A1* | 3/2017 | Tangeland ........... | H04N 5/2252 |
| 2017/0374253 A1 | 12/2017 | Cahall et al. | |
| 2018/0121065 A1* | 5/2018 | Seo ........................ | G06F 9/451 |

FOREIGN PATENT DOCUMENTS

| | | |
|---|---|---|
| CN | 104281224 A | 1/2015 |
| CN | 105991904 A | 10/2016 |
| CN | 205647698 U | 10/2016 |
| CN | 106657736 A | 5/2017 |
| CN | 107295232 A | 10/2017 |

OTHER PUBLICATIONS

Extended European search report issued in corresponding European application No. 19175711.1 dated Aug. 22, 2019.
First Office Action from China patent office in a counterpart Chinese patent Application 201810488516.3, dated Mar. 2, 2020 (7 pages).

* cited by examiner

CAMERA ASSEMBLY WITH A PLURALITY OF CAMERAS AND HAVING LARGE SHOOTING ANGLE, AND ELECTRONIC APPARATUS HAVING THE SAME

CROSS-REFERENCE TO RELATED APPLICATION(S)

This application claims priority to Chinese Patent Application No. 201810488516.3, filed on May 21, 2018, the contents of which are herein incorporated by reference in their entireties.

TECHNICAL FIELD

The described embodiments relate to electronic apparatus technology, and more particularly, to a camera assembly and an electronic apparatus.

BACKGROUND

With the development of electronic apparatus technology, more and more electronic apparatuses have integrated cameras. Since a traditional single-camera mode or dual-camera mode has a small shooting angle, shooting performance may be poor, and requirements of users may not be met.

SUMMARY

According to an aspect of the present disclosure, a camera assembly may be provided. The camera assembly may include: a first camera including a first light incident surface, a second camera including a second light incident surface, and a third camera including a third light incident surface. The first camera, the second camera, and the third camera may be spaced apart from each other in a same direction, and the second camera may be located between the first camera and the third camera. The first light incident surface and the second light incident surface may form a first preset angle, and the first preset angle may be in a range of 90° to 180°. The second light incident surface and the third light incident surface may form a second preset angle, and the second preset angle may be in a range of 90° to 180°.

According to another aspect of the present disclosure, a camera assembly may be provided. The camera assembly may include a substrate, a first camera including a first light incident surface, a second including a second light incident surface and a third camera including a third light incident surface. The first camera, the second camera, and the third camera may be arranged on the substrate and spaced apart from each other in a same direction, the second camera is located between the first camera and the third camera. A first normal vector of the first light incident surface may intersect a second normal vector of the second light incident surface, an included angle between the first normal vector and the second normal vector is smaller than 90°. A third normal vector of the third light incident surface may intersect the second normal vector, an included angle between the third normal vector and the second normal vector is smaller than 90°.

According to still another aspect of the present disclosure, an electronic apparatus may be provided. The electronic apparatus may include a housing defining a through hole and a camera assembly arranged in the housing and capturing light via the through hole. The camera assembly may include: a first camera including a first light incident surface, a second camera including a second light incident surface, and a third camera including a third light incident surface. The first camera, the second camera, and the third camera may be spaced apart from each other in a same direction, and the second camera may be located between the first camera and the third camera. The first light incident surface and the second light incident surface may form a first preset angle, and the first preset angle may be in a range of 90° to 180°. The second light incident surface and the third light incident surface may form a second preset angle, and the second preset angle may be in a range of 90° to 180°.

BRIEF DESCRIPTION OF DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

Figure 1:
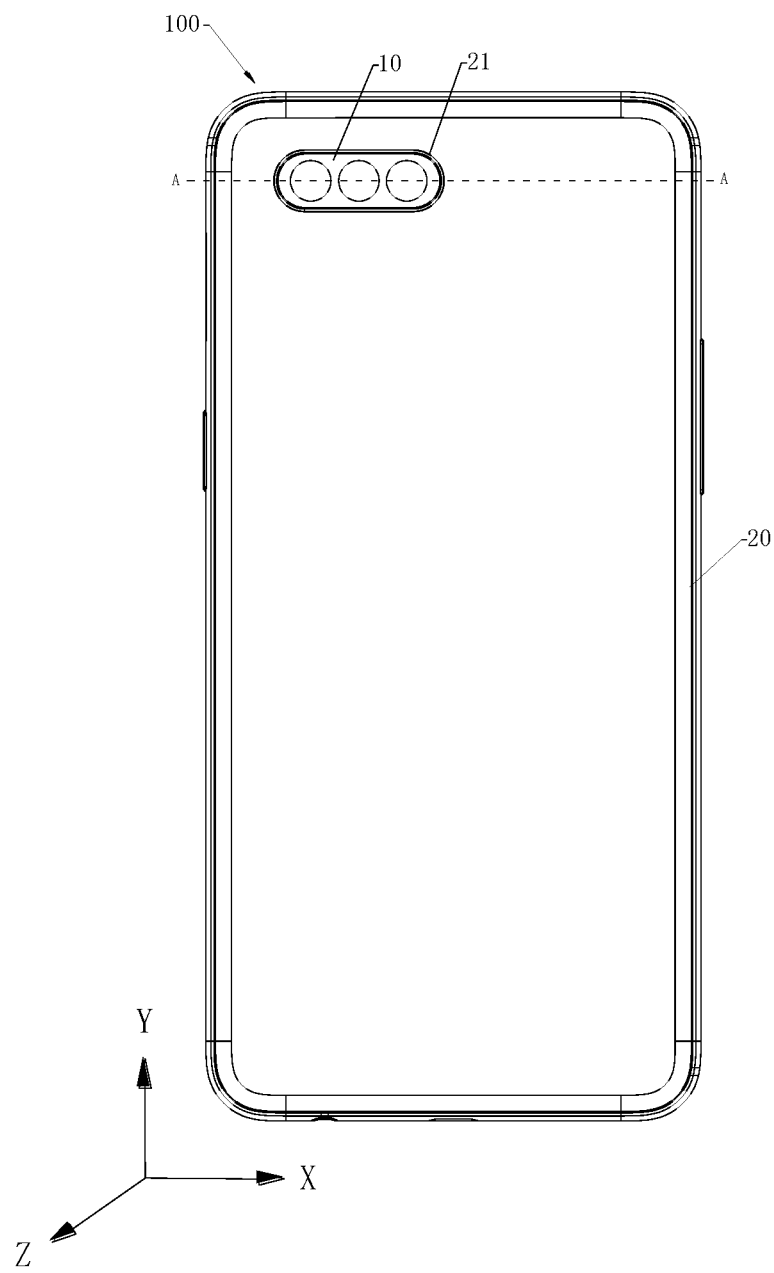
FIG. 1 is a schematic view of an electronic apparatus in a first view angle, in accordance with an embodiment of the present disclosure.
Figure 2:
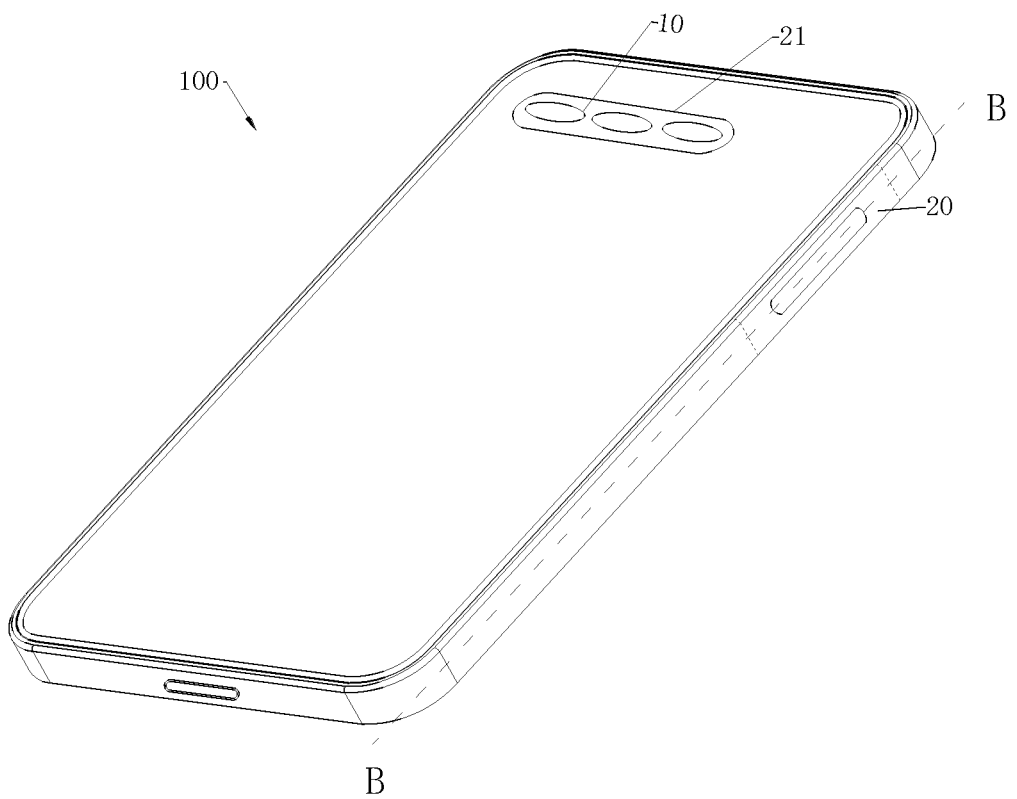
FIG. 2 is a schematic view of the electronic apparatus shown in FIG. 1, in another view angle.

The technical solutions in the embodiments of the present disclosure will be clearly and completely described in the following with reference to the accompanying drawings in the embodiments of the present disclosure.

The above described objects, features and advantages of the present disclosure will be more clearly understood from the following description in conjunction with the drawings and embodiments. It should be noted that, in the case of no conflict, the features in the embodiments and the embodiments of the present disclosure may be combined with each other.

The detailed description set forth below is intended to facilitate a full understanding of the present disclosure. The described embodiments are merely parts of the embodiments of the present disclosure, not all embodiments. Based on the embodiments in the present disclosure, all other embodiments can be obtained by those skilled in the art without making any creative work are within the scope of the protection of the present disclosure.

In addition, the following embodiments are illustrated with reference to the accompanying drawings to illustrate specific embodiments that this application can be implemented. In the description of the present disclosure, it is to be understood that terms such as "length", "width", and "thickness", and the like, refer to the orientations and locational relations illustrated in the accompanying drawings. Thus, these terms used here are only for describing and understanding the present disclosure better and more clearly, and are not intended to indicate or imply that the device or the elements are disposed to locate at the specific directions or are structured and performed in the specific directions, which could not be understood as limiting the present disclosure. In the present disclosure, unless specified or limited definitely, otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

According to an aspect of the present disclosure, a camera assembly may be provided. The camera assembly may include a first camera including a first light incident surface, a second camera including a second light incident surface and a third camera including a third light incident surface. The first camera, the second camera, and the third camera may be spaced apart from each other in a same direction, and the second camera may be located between the first camera and the third camera. The first light incident surface and the second light incident surface may form a first preset angle, and the first preset angle may be in a range of 90° to 180°. The second light incident surface and the third light incident surface may form a second preset angle, and the second preset angle may be in a range of 90° to 180°.

In an embodiment, the first preset angle may be a, a light capture angle of the first camera is γ; and $\alpha \geq 90° + \gamma/2$.

In another embodiment, a first distance between the first camera and the second camera may be equal to a second distance between the third camera and the second camera, the first preset angle may be equal to the second preset angle.

In still another embodiment, the camera assembly further may include a substrate, a first driving component arranged on the substrate and a sliding plate arranged on the substrate. The first camera may be fixed on the sliding plate, the first driving component may be configured to drive the sliding plate to slide relative to the substrate.

In an embodiment, the camera assembly further may include a base, a second driving component received in the base and a first turntable received in the base. The first camera may be fixed on the first turntable, the second driving component may be configured to drive the first turntable to rotate.

In another embodiment, the second driving component may include a first driving device fixed on the base and a first transmission member having a first tooth portion. The first driving device may be configured to drive the first transmission member to move. A circumference of the first turntable may be provided with a second tooth portion, the first tooth portion may be engaged with the second tooth portion.

In still another embodiment, the camera assembly may further include a bearing plate slidably mounted on the base and a connecting rod including a first end and a second end arranged opposite each other. The first end may be fixed on the bearing plate, the second end is rotatably coupled to the first turntable.

In an embodiment, the camera assembly may further include a third driving component received in the base, a second turntable received in the base. The second camera is fixed on the second turntable, the second driving component is configured to drive the second turntable to rotate. An angular velocity of the first turntable is different from an angular velocity of the second turntable.

In another embodiment, the camera assembly may further include a base, a second driving device, a second rack, a third turntable and a fourth turntable, the second driving device, the second rack, the third turntable and the fourth turntable may be received in the base. The first camera may be fixed on the third turntable, the third camera may be fixed on the fourth turntable. A first gear tooth may be arranged on a circumference of the third turntable, a second gear tooth may be arranged on a circumference of the fourth turntable, the first gear tooth and the second gear tooth may be engaged with the second rack. The second driving device may be configured to drive the second rack to move.

In still another embodiment, the first camera, the second camera and the third camera may be arranged on a base plate. A distance between the first light incident surface and the base plate may be gradually decreased in a direction from the first camera to the third camera. A distance between the third light incident surface and the base plate may be gradually decreased in a direction from the third camera to the first camera.

In an embodiment, the first camera, the second camera and the third camera may be arranged on a base plate. A distance between the first light incident surface and the base plate may be gradually increased in a direction from the first camera to the third camera. A distance between the first light incident surface and the base plate may be gradually increased in a direction from the first camera to the third camera.

In another embodiment, the camera assembly may further include a substrate, a driving component arranged on the substrate and a sliding plate arranged on the substrate and connected to the driving component. The first camera may be fixed on the sliding plate, the driving component may be configured to drive the sliding plate to slide, such that the first camera is driven to move relative to the second camera.

In still another embodiment, the driving component may include a motor and a threaded rod. The sliding plate may define a threaded hole. An end of the threaded rod may be fixed on an output shaft of the motor, the other end of the threaded rod may be inserted into the threaded hole and rotatably engaged with the sliding plate. The motor may be configured to drive the threaded rob to rotate, so as to drive the sliding plate to slide.

In an embodiment, the driving component may include an electromagnetic coil arranged on the substrate and a permanent magnet arranged in the first camera. When the electromagnetic coil generates an attractive force to the permanent magnet, the first camera may move away from the second camera; when the electromagnetic coil generates a repulsive force to the permanent magnet, the first camera may move toward the second camera.

In another embodiment, the camera assembly may further include a base, a first driving component received in the base and a first turntable received in the base and connected to the first component. The first camera is fixed on the first turntable, the first driving component is configured to drive the first turntable to rotate, such that the first camera is driven to rotate relative to the second camera.

In still another embodiment, the first driving component may further include a driving device fixed on the base and a transmission member connected to the driving device and having a first tooth portion. The driving device is configured to drive he transmission member to move. A circumference of the first turntable may be provided with a second tooth portion, the first tooth portion may be engaged with the second tooth portion.

In an embodiment, the camera assembly may further include a second driving component received in the base and a second turntable received in the base and connected to the first driving component. The third camera may be fixed on the second turntable, the second driving component may be configured to drive the second turntable to rotate such that the third camera is driven to rotate relative to the second camera. An angular velocity of the first turntable is different from an angular velocity of the second turntable.

In another embodiment, the angular velocity of the first turntable being different from the angular velocity of the second turntable may be realized by at least one of: a direction of the angular velocity of the first turntable and a direction of the angular velocity of the second turntable are different and a magnitude of the angular velocity of the first turntable and a magnitude of the angular velocity of the second turntable are different.

In still another embodiment, the camera assembly may include a base, a driving device, a rack, a first turntable and a second turntable. The driving device, the rack, the first turntable and the second turntable may be received in the base. The first camera may be fixed on the first turntable, the third camera may be fixed on the second turntable. A first gear tooth may be arranged on a circumference of the first turntable, a second gear tooth may be arranged on a circumference of the second turntable, the first gear tooth and the second gear tooth may be arranged with the rack. The driving device may be configured to drive the rack to move to drive the first turntable and the second turntable to rotate, such that the first camera and the third camera are driven to rotate relative to the second camera.

According to another aspect of the present disclosure, the camera assembly may include a substrate, a first camera including a first light incident surface, a second camera including a second light incident surface and a third camera including a third light incident surface. The first camera, the second camera, and the third camera may be arranged on the substrate and spaced apart from each other in a same direction, the second camera may be located between the first camera and the third camera. A first normal vector of the first light incident surface may intersect a second normal vector of the second light incident surface, an included angle between the first normal vector and the second normal vector may be smaller than 90°. A third normal vector of the third light incident surface may intersect the second normal vector, an included angle between the third normal vector and the second normal vector may be smaller than 90°.

In an embodiment, the camera assembly may further include a first driving component, a second driving component, a first turntable and a second turntable. The first driving component, the second driving component, the first turntable and the second turntable may be arranged on the substrate. The first camera may be fixed on the first turntable, the first driving component may be connected to the first turntable and configured to drive the first turntable to rotate, so as to drive the first camera to rotate relative to the second camera. The third camera may be fixed on the second turntable, the second driving component may be connected to the second turntable and configured to drive the second turntable to rotate, so as to drive the third camera to rotate relative to the second camera.

In another embodiment, the camera assembly may further include a third driving component, a fourth driving component, a first sliding plate and a second sliding plate, the third driving component, the fourth driving component, the first sliding plate and the second sliding plate may be arranged on the substrate. The first turntable may be arranged on the first sliding plate, the third driving component may be connected to the first sliding plate to drive the first sliding plate to move, so as to drive the first camera to move relative to the second camera. The second turntable may be arranged on the second sliding plate, the fourth driving component may be connected to the second sliding plate to drive the second sliding plate to move, so as to drive the third camera to move relative to the second camera.

In still another embodiment, the camera assembly may further include a driving device, a rack, a first turntable and a second turntable, wherein the driving device, the rack, the first turntable and the second turntable may be received in the substrate. The first camera may be fixed on the first turntable, the third camera is fixed on the second turntable. A first gear tooth may be arranged on a circumference of the first turntable, a second gear tooth may be arranged on a circumference of the second turntable, the first gear tooth and the second gear tooth may be engaged with the rack. The driving device may be configured to drive the rack to move, so as to drive the first turntable and the second turntable to rotate, such that the first camera and the third camera are driven to rotate relative to the second camera.

In an embodiment, a first distance between the first camera and the second camera may be equal to a second distance between the third camera and the second camera. The first preset angle is equal to the second preset angle.

According to another aspect of the present disclosure, an electronic apparatus may be provided. The electronic apparatus may include a housing defining a through hole and a camera assembly arranged in the housing and capturing light via the through hole. The camera assembly may include a first camera having a first light incident surface, a second camera having a second light incident surface and a third camera having a third light incident surface. The first camera, the second camera, and the third camera are spaced apart from each other in a same direction, and the second camera may be located between the first camera and the third camera. The first light incident surface and the second light incident surface may form a first preset angle, and the first preset angle may be in a range of 90° to 180°. The second light incident surface and the third light incident surface may form a second preset angle, and the second preset angle may be in a range of 90° to 180°.

Referring to FIGS. 1 to 4, the present disclosure provides an electronic apparatus 100. The electronic apparatus 100 may be a smart device such as a tablet computer, a mobile phone, a camera, a personal computer, a notebook computer, an in-vehicle device, a wearable device, or the like. For convenience of description, the electronic apparatus 100 may be defined with reference to a first view angle. A width direction of the electronic apparatus 100 is defined as an X-axis, and the X-axis includes a positive direction and a negative direction. A length direction of the electronic apparatus 100 is defined as a Y-axis, and the Y-axis includes a positive direction and a negative direction. A thickness direction of the electronic apparatus 100 is defined as a Z-axis, and the Z-axis includes a positive direction and a negative direction.

In an embodiment, the electronic apparatus 100 may include a camera assembly 10 and a housing 20. A through hole 21 may be defined on the housing 20. The camera assembly 10 may be arranged inside the housing 20. The camera assembly 10 may capture light via the through hole 21.

In an embodiment, the camera assembly 10 may include a first camera 11, a second camera 12 and a third camera 13 arranged on a base plate 101. The first camera 11 may include a first light incident surface 111, the second camera 12 may include a second light incident surface 121, and the third camera 13 may include a third light incident surface 131. The camera assembly 10 may partially extend out of the through hole 21, i.e., the first light incident surface 111 of a first camera 11, the second light incident surface 121 of a second camera 12, and the third light incident surface 131 of a third camera 13 may extend out of the through hole 21. The first camera 11, the second camera 12, and the third camera 13 may be cooperated to shoot, to increase a multiple angles of shooting of the camera assembly 10, thereby the shooting effect of the camera assembly 10 may be improved.

Figure 4:
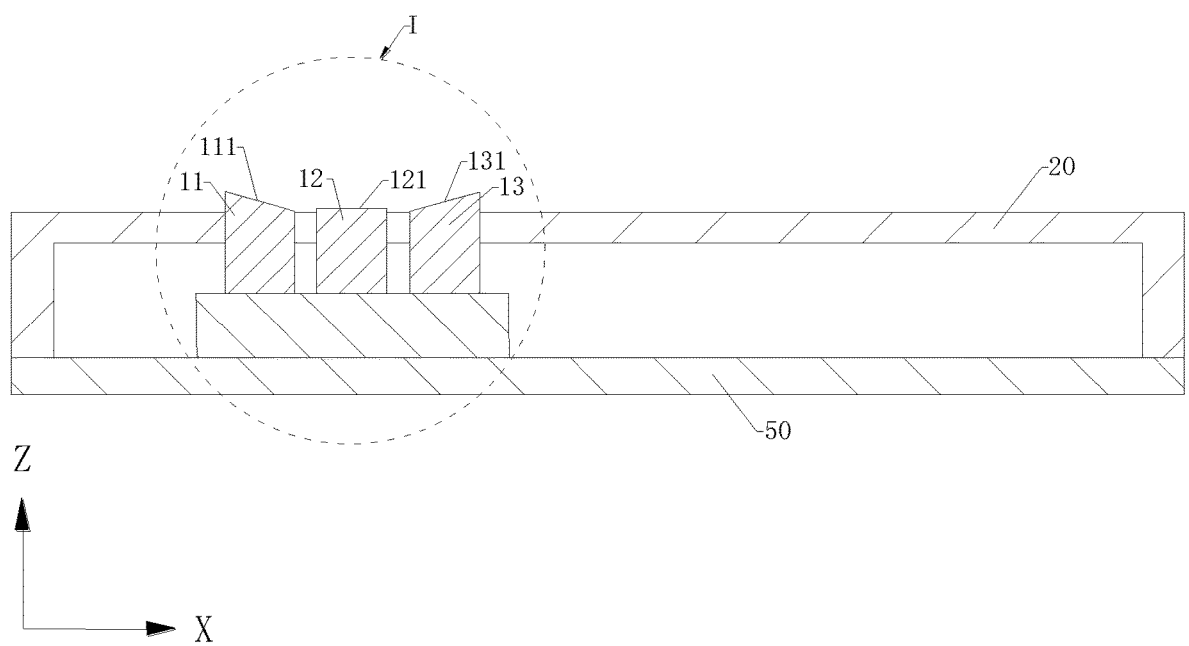
FIG. 4 is across-sectional view of the electronic apparatus shown in FIG. 1 taken along a line A-A thereof, in accordance with an embodiment of the present disclosure.

In an embodiment, as shown in FIG. 4, the electronic apparatus 100 may also include a display screen 50 and a circuit board (not shown in figure). The display screen 50 may be mounted on the housing 20 to form a display surface of the electronic apparatus 100. The display screen 50 may be electrically coupled to the circuit board. The circuit board may be a motherboard of the electronic apparatus 100 or a sub motherboard of the electronic apparatus 100. A camera chip may be arranged on the camera assembly 10, and the camera chip may be configured to process pictures taken by the first camera 11, the second camera 12, and the third camera 13. The camera chip may be electrically coupled to the circuit board. The camera chip may be configured to synthesize pictures taken by the camera assembly 10 by an image synthesis algorithm to obtain a picture desired by the user. For example, when a user shoots an object at multiple angles by the first camera 11, the second camera 12, and the third camera 13, the camera chip may synthesize pictures to form a combined picture, thereby shooting requirements of the user could be satisfied.

Figure 5:
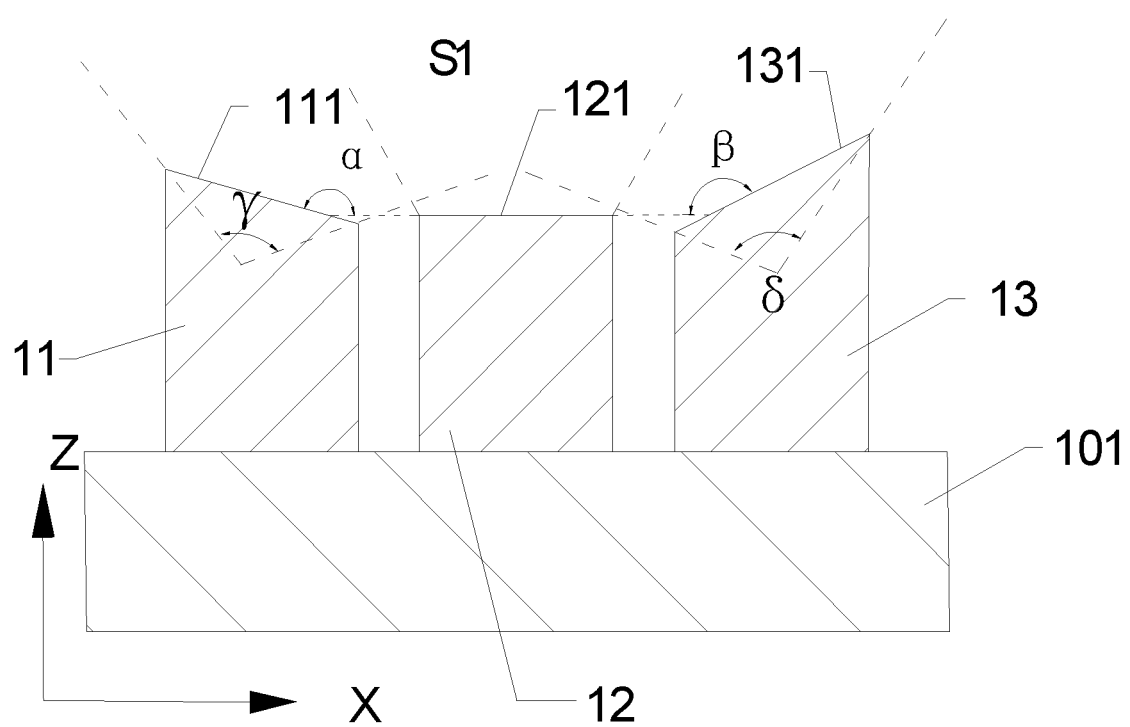
FIG. 5 is a schematic view of structure in circle I of the electronic apparatus shown in FIG. 4 in accordance with an embodiment of the present disclosure.
Figure 6:
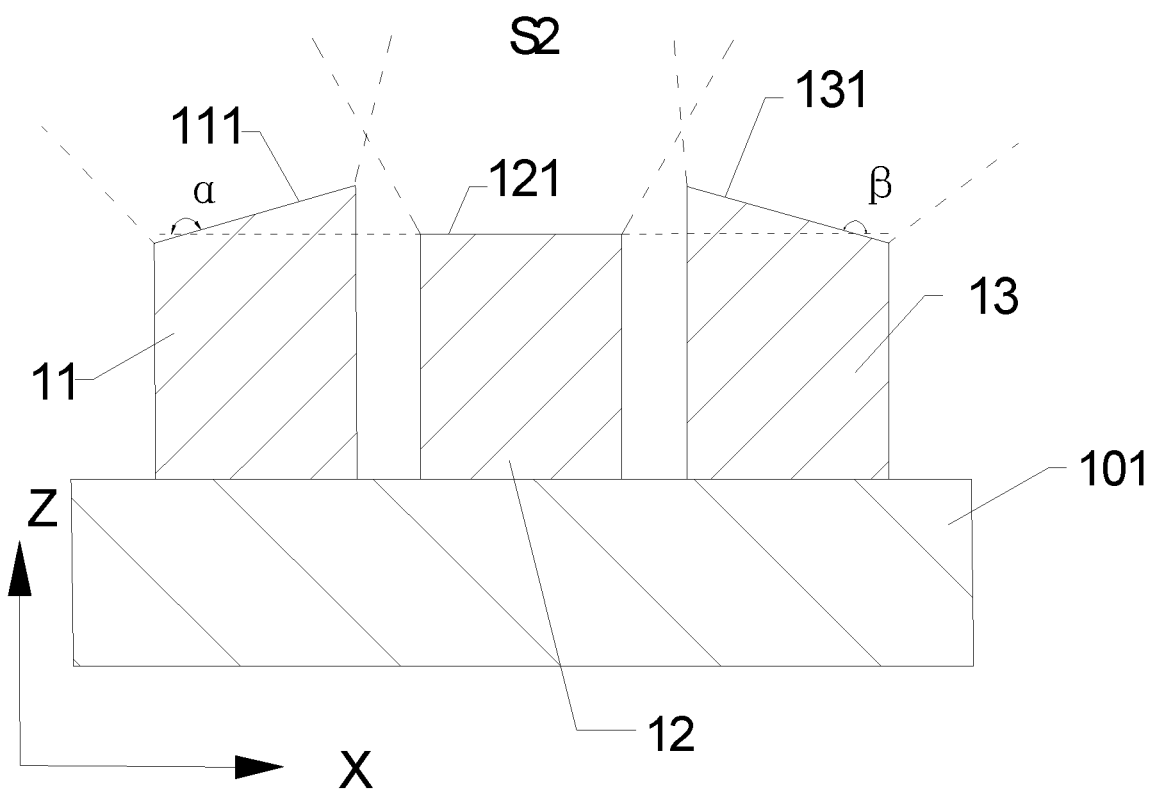
FIG. 6 is a schematic view of structure in circle I of the electronic apparatus shown in FIG. 4 in accordance with another embodiment of the present disclosure.

Referring to FIGS. 4 to 6, the present disclosure provides a camera assembly 10. The camera assembly 10 may include a first camera 11, a second camera 12, and a third camera 13 arranged on the base plate 101. The first camera 11, the second camera 12, and the third camera 13 may be spaced apart from each other in a same direction. The second camera 12 may be located between the first camera 11 and the third camera 13. The first camera 11 may include a first light incident surface 111. The second camera 12 may include a second light incident surface 121. The third camera 13 may include a third light incident surface 131. The first light incident surface 111 and the second light incident surface 121 may form a first preset angle α. The third light incident surface 131 and the second light incident surface 121 may form a second preset angle β. The first preset angle may be in a range of 90° to 180°. The second preset angle may be in a range of 90° to 180°. It should be noted that, the first preset angle α may be a complementary angle of an angle formed by a normal vector of the first light incident surface 111 and a normal vector of the second light incident surface 121, and the second preset angle β may be a complementary angle of an angle formed by a normal vector of the third light incident surface 131 and the normal vector of the second light incident surface 121.

In an embodiment, the first preset angle α may be set in the range of 90° to 180°, and the second preset angle β may be set in the range of 90° to 180°, so that the first camera 11 and the third camera 13 may capture a blind area of the second camera 12, thereby the shooting angle of the camera assembly 10 may be increased, which could improve the shooting effect of the camera assembly 10. It should be noted that, the blind area of the second camera 12 may refer to an area that the second camera 12 cannot capture.

Figure 3:
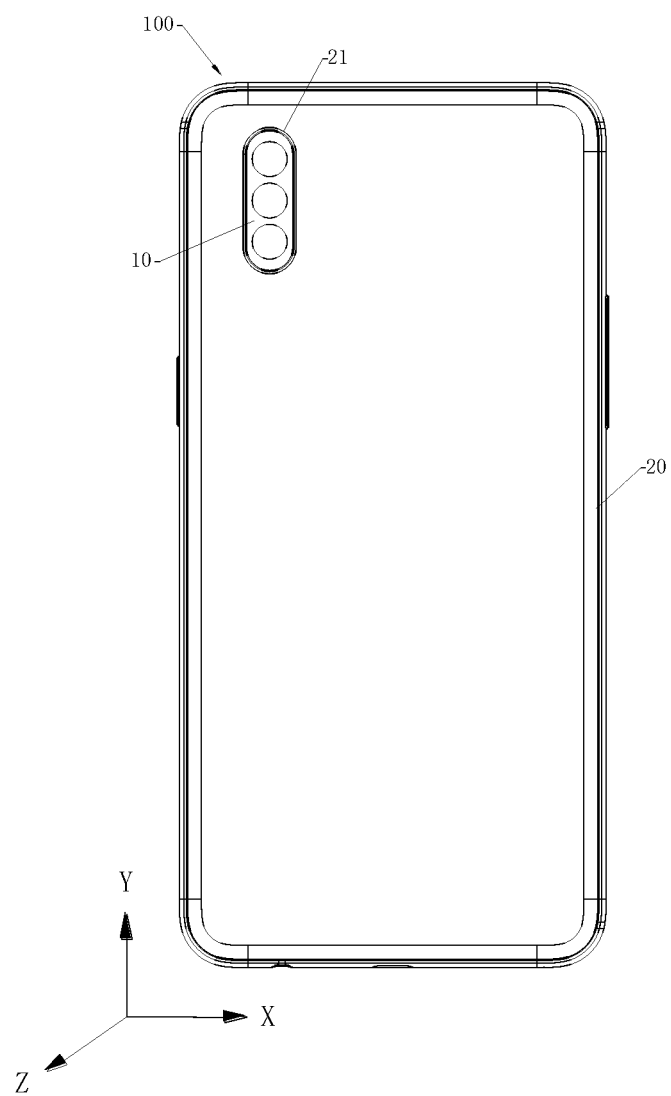
FIG. 3 is a schematic view of the electronic apparatus shown in FIG. 1 in accordance with another embodiment of the present disclosure.

In an embodiment, as shown in FIG. 1 and FIG. 3, the first camera 11, the second camera 12, and the third camera 13 may be spaced apart from each other in the X-axis direction. The first camera 11, the second camera 12, and the third camera 13 may be all telephoto cameras. The first camera 11, the second camera 12, and the third camera 13 may perform focus shooting on a person or an object. In other embodiments, the first camera 11, the second camera 12, and the third camera 13 may be arranged along the Y-axis direction or in a same direction in an X-Y plane. In other embodiments, the first camera 11, the second camera 12, and the third camera 13 may be wide-angle cameras. Specific settings may be based on actual conditions.

In an embodiment, orientations of the first light incident surface 111 and the third light incident surface 131 could be arranged in various manners.

In a first embodiment, as shown in FIG. 5, the first light incident surface 111 may be arranged toward the second light incident surface 121, that is, a distance between the first light incident surface 111 and the base plate 101 may be gradually decreased in a direction from the first camera 11 to the third camera 13, and the third light incident surface 131 may be arranged toward the second light incident surface 121, that is, a distance between the third light incident surface 131 and the base plate 101 is gradually decreased in a direction from the third camera 13 to the first camera 11. In other words, a direction of the normal vector of the first light incident surface 111 may be between the positive direction of the Z-axis and the positive direction of the X-axis. When an object is shot by the second camera 12, the second camera 12 shoots only an S1 area of the object, an area outside the S1 area is the blind area of the second camera 12. When the first camera 11 and the third camera 13 cooperate with the second camera 12 to shoot an object, a partial of the blind area of the second camera 12 may be shot by the first camera 11 and the third camera 13. Therefore, when the first camera 11 and the third camera 13 cooperate with the second camera 12 to shoot an object, a shooting angle of the object may be increased, thereby multi-azimuth shooting of the object may be achieved, and the object may be shot at a larger angle, which could improve shooting quality of the object.

In a second embodiment, as shown in FIG. 6, difference of this embodiment from the first embodiment is that, the first light incident surface 111 may be arranged away from the second light incident surface 121, that is, a distance between the first light incident surface 111 and the base plate 101 may be gradually increased in a direction from the first camera 11 to the third camera 13; and the third light incident surface 131 may be arranged away from the second light incident surface 121, that is, a distance between the third light incident surface 131 and the base plate 101 may be gradually increased in a direction from the third camera 13 to the first camera 11. In other words, the direction of normal vector of the first light incident surface 111 may be between the positive direction of the Z-axis and the negative direction of the X-axis. When an object is shot by the second camera 12, the second camera 12 shoots only an S2 area of the object, an area outside the S2 area is the blind area of the second camera 12. When the first camera 11 and the third camera 13 cooperate with the second camera 12 to shoot, a partial of the blind area of the second camera 12 may be shot by the first camera 11 and the third camera 13. Therefore, when the first camera 11 and the third camera 13 cooperate with the second camera 12 to shoot an object, a shooting angle of the object may be increased, thereby multi-azimuth shooting of the object may be achieved. The object may be shot at a larger angle, which could improve shooting quality of the object. When the camera assembly 10 is applied to a distant view, most of a peripheral area besides an object may be shot, thereby the shooting effect of the camera assembly 1 may be improved.

In this embodiment, the first preset angle of the first camera 11 is $\alpha$, and a light capture angle of the first camera 11 is $\gamma$, and $\alpha \geq 90° + \gamma/2$. In this embodiment, the first camera 11, the second camera 12, and the third camera 13 may be spaced apart in the X-axis direction. When $\alpha = 90° + \gamma/2$, the shooting angle of the first camera 11 may cover the positive direction of the X-axis, thereby the first camera 11 may shoot the blind area of the second camera 12 in the positive direction of the X-axis, that is, light parallel to the X-axis could be incident into the first camera 11. When $\alpha > 90° + \gamma/2$, the shooting angle of the first camera 11 may be between the positive direction of the X-axis and the positive direction of the Z-axis, that is, both the light parallel to the X-axis and the light parallel to the Z-axis could be incident into the first camera 11. Referring to FIG. 5, When $\alpha > 90° + \gamma/2$, the first camera 11 may cooperate with the second camera 12 to increase the shooting angle of the camera assembly 10, thereby a better shooting effect of the camera assembly 10 may be achieved. Further, the second preset angle of the third camera 13 is $\beta$, and the light capture angle of the third camera 13 is $\delta$, and $\beta \geq 90° + \delta/2$. When $\beta = 90° + \delta/2$, the shooting angle of the third camera 13 may cover the negative direction of the X-axis, thereby the third camera 13 may shoot the blind area of the second camera 12 in the negative direction of the X-axis, that is, light parallel to the X-axis could be incident into the third camera 13. When $\beta > 90° + \delta/2$, the shooting angle of the third camera 13 may be between the negative direction of the X-axis and the positive direction of the Z-axis, that is, both the light parallel to the X-axis and the light parallel to the Z-axis could be incident into the third camera 13. The first camera 11 and the third camera 13 may cooperate with the second camera 12, so that the shooting angle of the camera assembly 10 may be increased, thereby a better shooting effect of the camera assembly 10 may be achieved.

Figure 7:
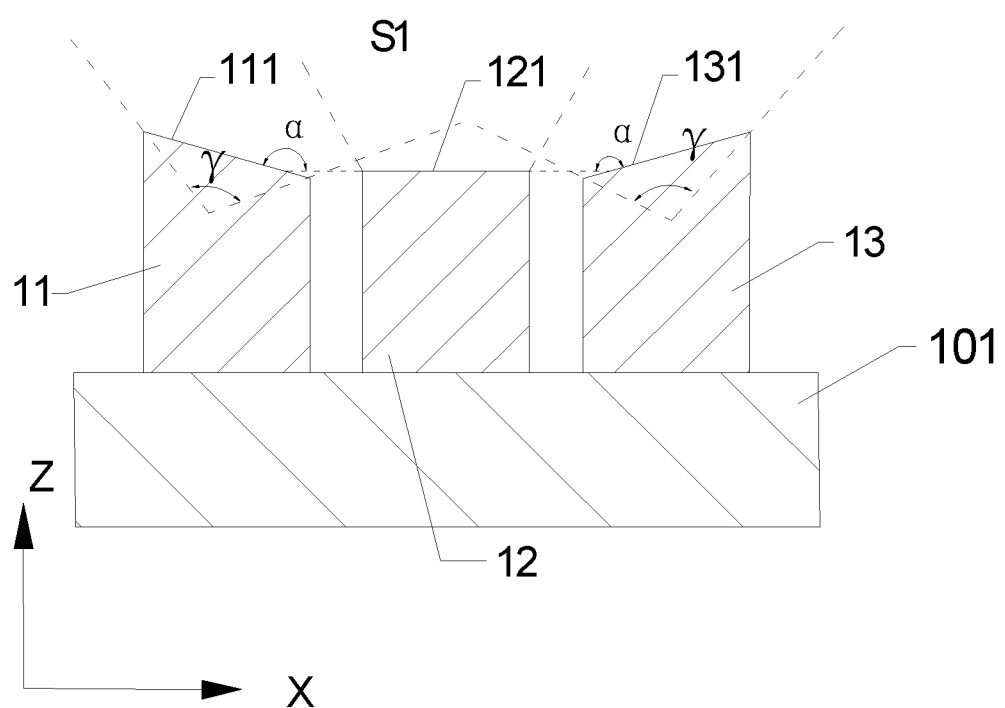
FIG. 7 is a schematic view of structure in circle I of the electronic apparatus shown in FIG. 4 in accordance with still another embodiment of the present disclosure.

Further, a distance between the first camera 11 and the second camera 12, may be equal to a distance between the third camera 13 and the second camera 12, and the first preset angle $\alpha$ may be equal to the second preset angle $\beta$. In this embodiment, as shown in FIG. 7, the light capture angle $\gamma$ of the first camera 11 may be equal to the light capture angle $\delta$ of the third camera 13. Since the distance between the first camera 11 and the second camera 12 is equal to the distance between the third camera 13 and the second camera 12, and the first preset angle $\alpha$ is equal to the second preset angle $\beta$, the first camera 11 and the third camera 13 of the camera unit 10 may be symmetrically centered on the second camera 12. Therefore, appearance of consistency of the camera assembly 10 could be achieved, and further it is convenient for the first camera 11 and the third camera 13 to simultaneously focus. Thereby, preventing pictures shot by the first camera 11 and the second camera 12 from being combined hardly, due to inconsistent focal lengths.

Figure 8:
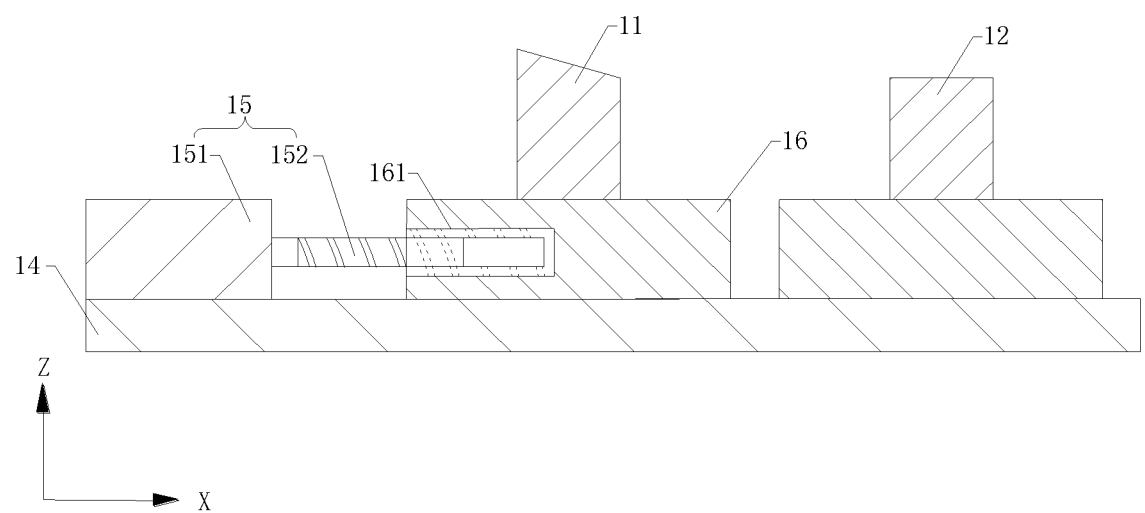
FIG. 8 is a schematic view of structure in circle I of the electronic apparatus shown in FIG. 4 in accordance with further another embodiment of the present disclosure.

As shown in FIG. 8, the camera assembly 10 may include a substrate 14, a first driving component 15 arranged on the substrate 14, and a sliding plate 16 arranged on the substrate 14. The first camera 11 may be fixed on the sliding plate 16. The first driving component 15 may be configured to drive the sliding plate 16 to slide relative to the substrate 14. In this embodiment, the first driving component 15 may include a motor 151 and a threaded rod 152. A threaded hole 161 may be defined in the sliding plate 16. One end of the threaded rod 152 may be fixed on an output shaft of the motor 151, and the other end of the threaded rod 152 may be inserted into the threaded hole 161 and the rotatably engaged with sliding plate 16. When the motor 151 is activated, the motor 151 may drive the threaded rod 152 to rotate, and the threaded rod 152 may drive the sliding plate 16 to move away from the second camera 12. Therefore, the first camera 11 may be driven by the motor 151 to move relative to the second camera 12, to automatically adjust the distance between the first camera 11 and the second camera 12. Thereby, an overlapping area captured by the first camera 11 and the second camera 12 may be reduced, so as to improve the shooting angle of the camera assembly 10, and a better shooting effect of the camera assembly 10 may be achieved. Specific settings may be based on actual conditions. Further, balls may be arranged on the sliding plate 16 facing the substrate 14, so that a friction force between the sliding plate 16 and the substrate 14 may be reduced, thereby adjustment accuracy of the distance between the first camera 11 and the second camera 12 may be improved.

In other embodiments, an electromagnetic coil may be arranged on the substrate 14, and the electromagnetic coil may be coupled to the circuit board. A permanent magnet may be arranged in the first camera 11. A current signal may be applied to the electromagnetic coil by the circuit board, so that the electromagnetic coil generates a magnetic field, and further make two magnetic poles of the electromagnetic coil and the permanent magnet facing each other may be same or different. When the magnetic field generated by the electromagnetic coil generates an attractive force to the permanent magnet, the first camera 11 may move in a direction away from the second camera 12. When the magnetic field generated by the electromagnetic coil generates a repulsive force to the permanent magnet, the first camera 11 may move toward the second camera 12. Therefore, adjustment of the distance between the first camera 11 and the second camera 12 could be achieved by arranging the electromagnetic coil on the substrate 14. Thereby, an overlapping area captured by the first camera 11 and the second camera 12 may be reduced, and a better shooting effect of the camera assembly 10 may be achieved.

Further, the camera assembly 10 may also include a driving component configured to drive the third camera 13 to move. The driving component may be identical in structure to the first driving component 15. Therefore, adjustment of the distance between the third camera 13 and the second camera 12 could be achieved by arranging the driving component configured to drive the third camera 13 on the camera assembly 10. Thereby, an overlapping area captured by the third camera 13 and the second camera 12 could be reduced, so as to improve the shooting angle of the camera assembly 10, and a better shooting effect of the camera assembly 10 may be achieved.

Further, when the first camera 11 and the third camera 13 are simultaneously driven to move relative to the second camera 12 by the driving components, the overlapping area captured by the first camera 11 and the second camera 12 and the overlapping area captured by the third camera 13 and the second camera 12, may be simultaneously reduced, which could improve the shooting angle of the camera assembly 10, thus a better shooting effect of the camera assembly 10 may be achieved.

Figure 9:
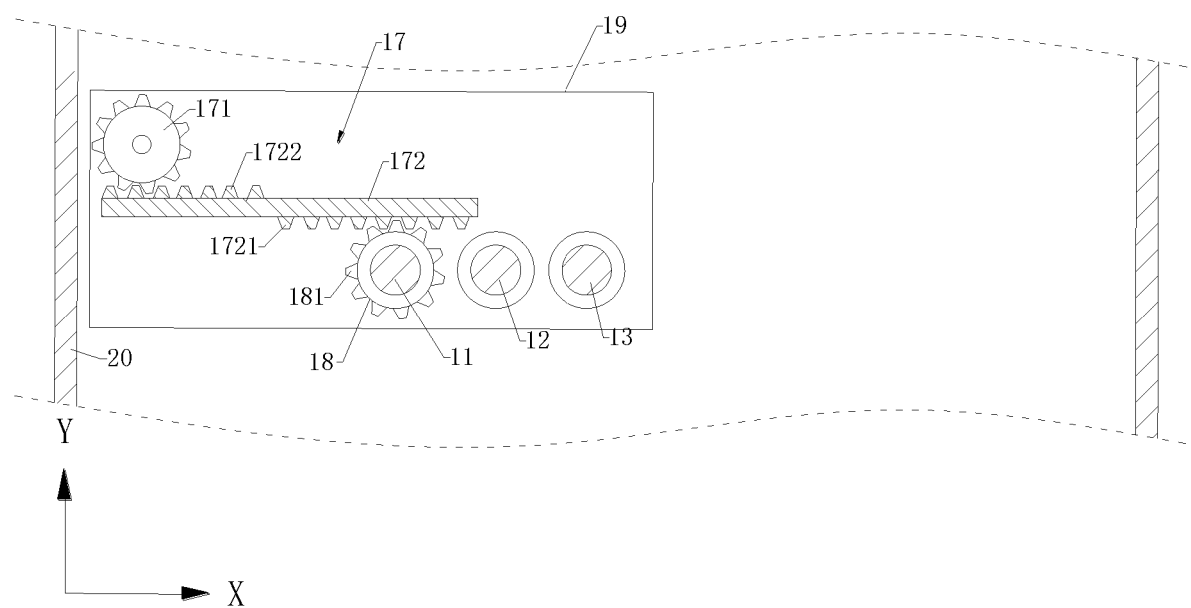
FIG. 9 is a cross-sectional view of the electronic apparatus shown in FIG. 2 taken along a line B-B thereof, in accordance with an embodiment of the present disclosure.

As shown in FIG. 9, the camera assembly 10 may include a base 19, a second driving component 17 received in the base 19, and a first turntable 18 received in the base 19. The first camera 11 may be fixed on the first turntable 18. The second driving component 17 may be configured to drive the first turntable 18 to rotate. In this embodiment, the first turntable 18 may be driven to rotate by the second driving component 17, so that the first turntable 18 may drive the first camera 11 to rotate. The first light incident surface 111 of the first camera 11 may be rotated relative to the second light incident surface 121, to further increase a shooting area of the first camera 11, so that the shooting area of the first camera 11 may further cover the blind area of the second camera 12. Therefore, the first turntable 18 being rotated by the second driving component 17 could make it possible to realize that when only the first camera 11 shoots an object, the first camera 11 may shoot at multiple angles; and could also make it possible to realize that when the first camera 11 and the second camera 12 cooperate to shoot, the shooting area of the first camera 11 may further cover the blind area of the second camera 12. As a result, the shooting angle of the camera assembly 10 could be increased, and a better shooting effect of the camera assembly 10 could be achieved.

The second driving component 17 may include a first driving device 171, and a first transmission member 172. The first driving device 171 may be fixed on the base 19. The first driving device 171 may be configured to drive the first transmission member 172 to move. A first tooth portion 1721 may be arranged on the first transmission member 172. A second tooth portion 181 may be arranged on a circumference of the first turntable 18. The first tooth portion 1721 may be engaged with the second tooth portion 181. In this embodiment, the first driving device 171 may be, but may be not limited to a motor. The first transmission member 172 may be, but may be not limited to a first rack. A gear (not labeled) may be arranged on an output shaft of the first driving device 171. A third tooth portion 1722 may be arranged on one side of the first rack opposite to the side arranging the first tooth portion 1721. The gear arranged on the output shaft of the first driving device 171 may be engaged with the third tooth portion 1722. When the first driving device 171 is activated, the first driving device 171 may drive the first transmission member 172 to move, and the first transmission member 172 may drive the first turntable 18 to rotate. Therefore, the first turntable 18 may be driven to rotate by a motor, to automatically adjust a rotation angle of the first camera 11, thereby shooting an object at multiple angles by the first camera 11 may be achieved.

Figure 10:
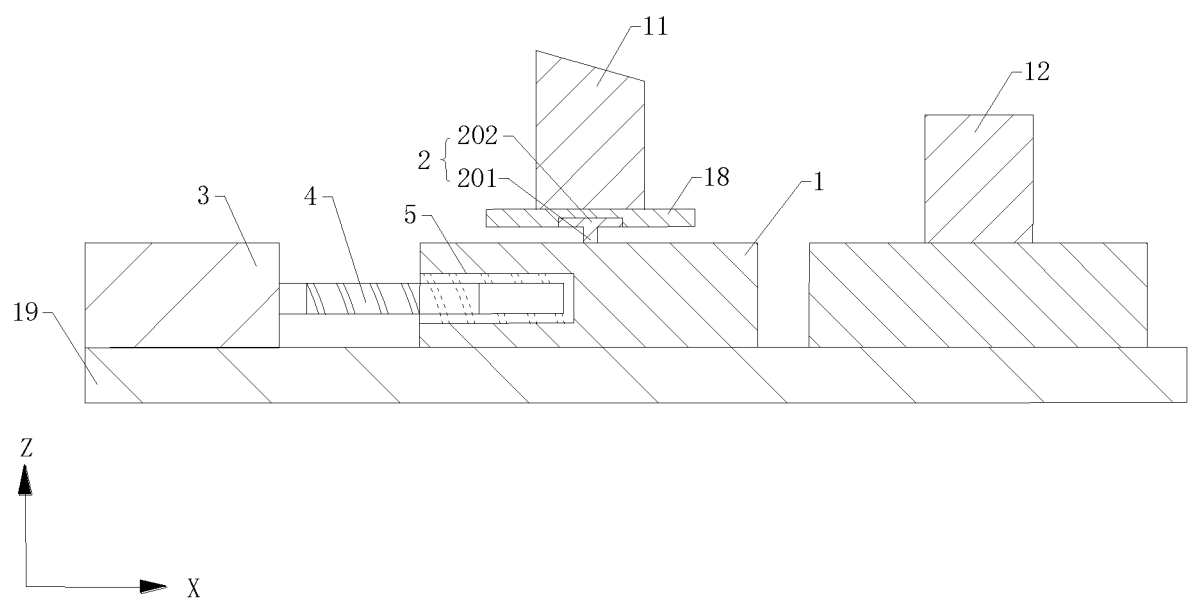
FIG. 10 is a schematic view of structure in circle I of the electronic apparatus shown in FIG. 4 in accordance with further another embodiment of the present disclosure.

Further, as shown in FIG. 10, the camera assembly 10 may include a bearing plate 1 and a connecting rod 2. The bearing plate 1 may be slidably mounted on the base 19. The connecting rod 2 may include a first end 201 and a second end 202 arranged opposite each other. The first end 201 may be fixed on the bearing plate 1. The second end 202 may be rotatably coupled to the first turntable 18. In this embodiment, the camera assembly 10 may further include a first motor 3 and a first threaded rod 4. A first threaded hole 5 may be defined in the bearing plate 1. One end of the first threaded rod 4 may be fixed on an output shaft of the first motor 3, and the other end of the first threaded rod 4 may be inserted into the first threaded hole 5 and rotatably engaged with the bearing plate 1. When the first motor 3 is activated, the first motor 3 may drive the first threaded rod 4 to rotate, and the first threaded rod 4 may drive the bearing plate 1 to move, so that the first turntable 18 coupled to the bearing plate 1 by the connecting rod 2 may move with moving of the bearing plate 1. Therefore, the first motor 3 may drive the first camera 11 to move relative to the second camera 12, to automatically adjust the distance between the first camera 11 and the second camera 12. When the distance between the first camera 11 and the second camera 12 increases, the overlapping area captured by the first camera 11 and the second camera 12 may be also reduced, which could improve the shooting angle of the camera assembly 10. Further, when the distance between the first camera 11 and the second camera 12 is automatically adjusted, the first driving device 171 may drive the first camera 11 to rotate. In this way, not only the overlapping area captured by the first camera 11 and the second camera 12 could be reduced, but also shooting an object at multiple angles could be realized, thereby a better shooting effect of the camera assembly 10 may be achieved. In other embodiments, two racks may be arranged to be engaged with each other, to automatically adjust the distance between the first camera 11 and the second camera 12, thereby the overlapping area captured by the first camera 11 and the second camera 12 may be reduced.

Figure 11:
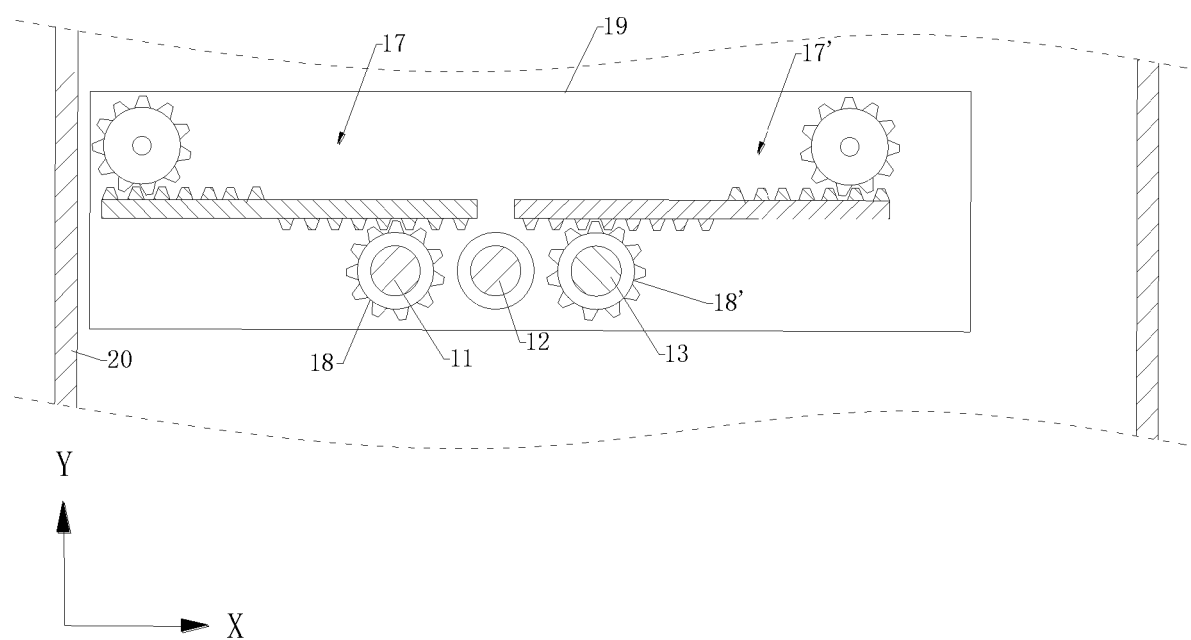
FIG. 11 is a cross-sectional view of the electronic apparatus shown in FIG. 2 taken along a line B-B thereof, in accordance with another embodiment of the present disclosure.

As shown in FIG. 4 and FIG. 11, the camera assembly 10 may include a third driving component 17' received in the base 19, and a second turntable 18' received in the base 19. The third camera 13 may be fixed on the second turntable 18'. The third driving component 17' may be configured to drive the second turntable 18' to rotate. In this embodiment, the second turntable 18' may be driven to rotate by the third driving component 17', so that the second turntable 18' may drive the third camera 13 to rotate. The third light incident surface 131 of the third camera 13 may be rotated relative to the second light incident surface 121, so as to further increase a shooting area of the third camera 13, so that the shooting area of the third camera 13 may further cover the blind area of the second camera 12. Therefore, the second turntable 18' may be driven to rotate by the third driving component 17', which could not only make it possible to realize that when only the third camera 13 shoots an object, the third camera 13 may shoot at multiple angles, but also could make it possible to realize that when the third camera 13 and the second camera 12 cooperate to shoot, the shooting area of the third camera 13 may further cover the blind area of the second camera 12. Therefore, the shooting angle of the camera assembly 10 may be increased, thereby a better shooting effect of the camera assembly 10 may be achieved.

In this embodiment, the third driving component 17' may be identical in structure to the second driving component 17, therefore no additional description is given herein. The second turntable 18 may be driven to rotate by the third driving component 17', so as to automatically adjust a rotation angle of the third camera 13. In this way, shooting an object at multiple angles by the third camera 13 could be achieved.

In this embodiment, an angular velocity of the first turntable 18 and an angular velocity of the second turntable 18' may be different, so that an angular velocity of the first camera 11 and an angular velocity of the third camera 13 may be different. Therefore, when the first camera 11 and the third camera 13 cooperate with the second camera 12 to shoot an object, the first camera 11 and the third camera 13 may have different rotation directions and magnitudes, which could further increase shooting angles of the first camera 11 and the third camera 13. Therefore, the camera assembly 10 could shoot at multiple angles, thereby a better shooting effect of the camera assembly 10 may be improved.

In this embodiment, the following manners could realize that the angular velocity of the first turntable 18 is different from that of the second turntable 18'.

In an embodiment, a direction of the angular velocity of the first turntable 18 and a direction of the angular velocity of the second turntable 18' may be different. For example, the first camera 11 may rotate in a clockwise direction, and the third camera 13 may rotate in a counterclockwise direction. When a user needs to shoot a picture, the second camera 12 may be first focused on a main object, and then scenes around the main object may be increased by rotating the first turntable 18 and the second turntable 18' with different directions of the angular velocity. Therefore, when the first camera 11 and the third camera 13 cooperate with each other, combination of pictures shot at different angles may be increased, and pictures of different angles may be shot to improve the shooting quality of the camera assembly 10. Further, the first camera 11 may shoot at rotation angles from 0° to 360°, to capture the blind area of the second camera 12 in the negative direction of the X-axis. Captured pictures may be integrated to form a picture with various angles. The picture with various angles may have a strong stereoscopic effect. Frequency of shooting could be taken for every 10° rotation.

In another embodiment, different from the above-mentioned embodiment is that, a magnitude of the angular velocity of the first turntable 18 and a magnitude of the angular velocity of the second turntable 18' may be different. For example, the first turntable 18 may be rotated two turns in one second, while the second turntable 18' may be rotated three turns in one second. When a user needs to shoot a picture, the second camera 12 may be first focused on a main object, and then scenes around the main object may be increased by rotating the first turntable 18 and the second turntable 18' with different magnitudes of the angular velocity. Therefore, when the first camera 11 and the third camera 13 cooperate with each other, combination of pictures shot at different angles may be increased, and pictures of different angles may be shot to improve the shooting quality of the camera assembly 10. Thereby, difference between the magnitude of the angular velocity of the first turntable 18 and the magnitude of the angular velocity of the second turntable 18' could make it possible to shoot pictures of different angles, so that the shooting quality of the camera assembly 10 may be improved.

Figure 12:
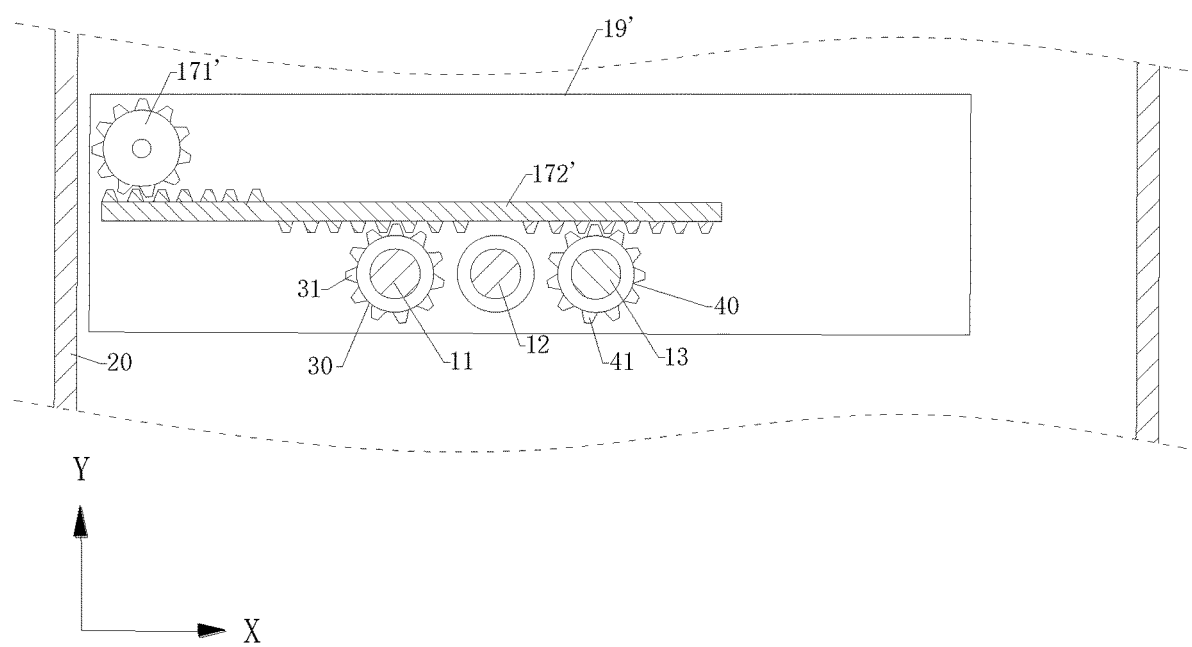
FIG. 12 is a cross-sectional view of the electronic apparatus shown in FIG. 2 taken along a line B-B thereof, in accordance with still another embodiment of the present disclosure.

In another embodiment, as shown in FIG. 12, the camera assembly 10 may include a base 19', a second driving device 171', a second rack 172', a third turntable 30, and a fourth turntable 40. The second driving device 171', the second rack 172', the third turntable 30, and the fourth turntable 40 may be received in the base 19'. The first camera 11 may be fixed on the third turntable 30. The third camera 13 may be fixed on the fourth turntable 40. The second driving device 171' may be configured to drive the second rack 172' to move. A first gear tooth 31 may be arranged on a circumference of the third turntable 30. A second gear tooth 41 may be arranged on a circumference of the fourth turntable 40. The first gear tooth 31 and the second gear tooth 41 may be simultaneously engaged with the second rack 172'. In this embodiment, the first driving device 171 may be, but may be not limited to a motor. Gear teeth may be arranged on both sides of the second rack 172'. A gear may be arranged on an output shaft of the second driving device 171'. The gear arranged on the output shaft of the second driving device 171' may be engaged with the second rack 172'. When the second driving device 171' is activated, the second driving device 171' may drive the second rack 172' to move along the direction of the X-axis, and the second rack 172' may simultaneously drive the third turntable 30 and the fourth turntable 40 to simultaneously rotate, so as to automatically adjust a rotation angle of the first camera 11 and the third camera 13. Thereby, shooting an object at multiple angles by the first camera 11 and the third camera 13 could be achieved, and a better shooting effect of the camera assembly 10 could be improved.

It is understood that the descriptions above are only alternative embodiments of the present disclosure. It should be noted that those skilled in the art can also make several improvements and modifications without departing from the principles of the present application, these improvements and modification shall all be covered within the protection of the disclosure.

What is claimed is:

1. A camera assembly, comprising:
   a first camera comprising a first light incident surface;
   a second camera comprising a second light incident surface; and
   a third camera comprising a third light incident surface;
   wherein the first camera, the second camera, and the third camera are spaced apart from each other in a same direction, and the second camera is located between the first camera and the third camera;
   the first light incident surface and the second light incident surface form a first preset angle, and the first preset angle is in a range of 90° to 180°; and
   the second light incident surface and the third light incident surface form a second preset angle, and the second preset angle is in a range of 90° to 180°;
   wherein the camera assembly further comprises:
   a substrate;
   a driving component arranged on the substrate and comprising a first motor and a first threaded rod; and
   a first sliding plate arranged on the substrate and connected to the driving component;
   wherein the first camera is fixed on the first sliding plate; the first sliding plate defines a threaded hole: an end of the threaded rod is fixed on an output shaft of the motor, and the other end of the threaded rod is inserted into the threaded hole and rotatable engaged with the first sliding plate; and the first motor is configured to drive the threaded rob to rotate, so as to drive the first sliding plate to slide, such that the first camera is driven to move relative to the second camera.

2. The camera assembly according to claim 1, wherein the first preset angle is $\alpha$, a light capture angle of the first camera is $\gamma$; and $\alpha > 90° + \gamma/2$.

3. The camera assembly according to claim 2, wherein a first distance between the first camera and the second camera is equal to a second distance between the third camera and the second camera; and
the first preset angle is equal to the second preset angle.

4. The camera assembly according to claim 1, wherein
a distance between the first light incident surface and the substrate is gradually decreased in a direction from the first camera to the third camera; and
a distance between the third light incident surface and the substrate is gradually decreased in a direction from the third camera to the first camera.

5. The camera assembly according to claim 1, wherein
a distance between the first light incident surface and the substrate is gradually, increase in a direction from the first camera to the third camera; and
a distance between the third light incident surface and the substrate is gradually increased in a direction from the third camera to the first camera.

6. The camera assembly according to claim 1, wherein the driving component comprises an electromagnetic coil arranged on the substrate and a permanent magnet arranged in the first camera;
when the electromagnetic coil generates an attractive force to the permanent magnet, the first camera moves away from the second camera; and
when the electromagnetic coil generates a repulsive force to the permanent magnet; the first camera moves toward the second camera.

7. The camera assembly according to claim 1, further comprising:
a first driving component received in the substrate; and
a first turntable received in the sliding plate and connected to the first driving component;
wherein the first camera is fixed on the first turntable, and the first driving component is configured to drive the first turntable to rotate, such that the first camera is driven to rotate relative to the second camera.

8. The camera assembly according to claim 7, wherein the first driving component comprises:
a driving device fixed on the substrate; and
a transmission member connected to the driving device and having a first tooth portion;
wherein the driving device is configured to drive the transmission member to move; and
a circumference of the first turntable is provided with a second tooth portion, and the first tooth portion is engaged with the second tooth portion.

9. The camera assembly according to claim 8, further comprising:
a connecting rod comprising a first end and a second end arranged opposite each other, wherein the first end is fixed on the sliding plate, and the second end is rotatably coupled to the first turntable.

10. The camera assembly according to claim 7, further comprising:
a second driving component received in the substrate; and
a second turntable received in the sliding plate and connected to the first driving component;
wherein the third camera is fixed on the second turntable; and the second driving component is configured to drive the second turntable to rotate, such that the third camera is driven to rotate relative to the second camera; and
an angular velocity of the first turntable is different from an angular velocity of the second turntable.

11. The camera assembly according to claim 10, wherein the angular velocity of the first turntable being different from the angular velocity of the second turntable is realized by at least one of:
a direction of the angular velocity of the first turntable and a direction of the angular velocity of the second turntable are different; and
a magnitude of the angular velocity of the first turntable and a magnitude of the angular velocity of the second turntable are different.

12. The camera assembly according to claim 1, further comprising:
a driving device, a rack, a first turntable and a second turntable, wherein
the driving device and the rack are received in the substrate, and the first turntable is received in the first sliding plate, and the second turntable is received in the second sliding plate;
the first camera is fixed on the first turntable, the third camera is fixed on the second turntable;
a first gear tooth is arranged on a circumference of the first turntable, a second gear tooth is arranged on a circumference of the second turntable, and the first gear tooth and the second gear tooth are engaged with the rack; and
the driving device is configured to drive the rack to move to drive the first turntable and the second turntable to rotate, such that the first camera and the third camera are driven to rotate relative to the second camera.

13. A camera assembly, comprising:
a substrate;
a first camera comprising a first light incident surface;
a second camera comprising a second light incident surface; and
a third camera comprising a third light incident surface;
wherein the first camera, the second camera, and the third camera are arranged on the substrate and spaced apart from each other in a same direction, and the second camera is located between the first camera and the third camera;
a first normal vector of the first light incident surface intersects a second normal vector of the second light incident surface; and an included angle between the first normal vector and the second normal vector is smaller than 90°;
a third normal vector of the third light incident surface intersects the second normal vector, and an included angle between the third normal vector and the second normal vector is smaller than 90°;
a first driving component comprising a first driving device fixed on the substrate and a first transmission member connected to the first driving device and having a first tooth portion; and
a first turntable received in the substrate and connected to the first driving component;
wherein the first camera is fixed on the first turntable, a circumference of the first turntable is provided with a second tooth portion, and the first tooth portion is engaged with the second tooth portion; the first driving device is configured to drive the first transmission member to move to drive the first turntable to rotate, such that the first camera is driven to rotate relative to the second camera.

14. The camera assembly according to claim 13, further comprising a second driving component comprising a second driving device fixed on the substrate and a second transmission member connected to the second driving device and having a third tooth portion; and
- a second turntable, received in the substrate and connected to the second driving component;
- wherein the third camera is fixed on the second turntable, a circumference of the second turntable is provided with a fourth tooth portion, and the third tooth portion is engaged with the fourth tooth portion; the second driving device is configured to drive the second transmission member to move to drive the third turntable to rotate, such that the third camera is driven to rotate relative to the second camera.

15. The camera assembly according to claim 14, further comprising a third driving component, a fourth driving component, a first sliding plate and a second sliding plate, wherein
- the third driving component, the fourth driving component, the first sliding plate and the second sliding plate are arranged on the substrate;
- the first turntable is arranged on the first sliding plate, and the third driving component is connected to the first sliding plate to drive the first sliding plate to move, so as to drive the first camera to move relative to the second camera; and
- the second turntable is arranged on the second sliding plate, and the fourth driving component is connected to the second sliding plate to drive the second sliding plate to move, so as to drive the third camera to move relative to the second camera.

16. The camera assembly according to claim 13, wherein a first distance between the first camera and the second camera is equal to a second distance between the third camera and the second camera; and
- the included angle between the first normal vector and the second normal vector is equal to the included angle between the third normal vector and the second normal vector.

17. An electronic apparatus, comprising:
a housing defining a through hole; and
a camera assembly arranged in the housing and capturing light via the through hole, wherein the camera assembly comprises:
- a base;
- a first camera having a first light incident surface;
- a second camera having a second light incident surface; and
- a third camera having a third light incident surface;
- wherein the first camera, the second camera, and the third camera are arranged on the base and spaced apart from each other in a same direction, and the second camera is located between the first camera and the third camera;
- the first light incident surface and the second light incident surface form a first preset angle, and the first preset angle is in a range of 90° to 180°; and
- the second light incident surface and the third light incident surface form a second preset angle, and the second preset angle is in a range of 90° to 180°;
- wherein the camera assembly further comprises a driving device, a rack, a first turntable and a second turntable, wherein
- the driving device, the rack, the first turntable and the second turntable are received in the base;
- the first camera is fixed on the first turntable, and the third camera is fixed on the second turntable;
- a first gear tooth is arranged on a circumference of the first turntable, a second gear tooth is arranged on a circumference of the second turntable, and the first gear tooth and the second gear tooth are engaged with the rack; and
- the driving device is configured to drive the rack to move, so as to drive the first turntable and the second turntable to rotate, such that the first camera and the third camera are driven to rotate relative to the second camera.

18. The camera assembly according to claim 1, further comprising a second sliding plate arranged on the substrate and connected to the driving component;
- wherein the driving component further comprises a second motor and a second threaded rod; the second camera is fixed on the second sliding plate; the second sliding plate defines a threaded hole; an end of the second threaded rod is fixed on an output shaft of the second motor, the other end of the second threaded rod is inserted into the threaded hole of the second sliding plate and rotatably engaged with the second sliding plate; and the second motor is configured to drive the second threaded rob to rotate, so as to drive the second sliding plate to slide, such the third camera is driven to move relative to the second camera.

* * * * *